(12) United States Patent
Wang et al.

(10) Patent No.: US 11,267,721 B2
(45) Date of Patent: Mar. 8, 2022

(54) ARTIFICIAL NACRE MATERIAL WITH LAYERED STRUCTURE AND PREPARATION METHOD THEREOF

(71) Applicant: Wuhan University of Technology, Wuhan (CN)

(72) Inventors: Fazhou Wang, Wuhan (CN); Zhichao Liu, Wuhan (CN); Ming Lei, Wuhan (CN); Shuguang Hu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/241,339

(22) Filed: Apr. 27, 2021

(65) Prior Publication Data

US 2021/0340019 A1  Nov. 4, 2021

(30) Foreign Application Priority Data

Apr. 29, 2020 (CN) .......................... 202010357914.9

(51) Int. Cl.
| | | |
|---|---|---|
| *C01F 11/18* | (2006.01) | |
| *B28B 1/00* | (2006.01) | |
| *C04B 28/18* | (2006.01) | |
| *C04B 40/02* | (2006.01) | |
| *C04B 41/00* | (2006.01) | |
| *C04B 111/00* | (2006.01) | |

(52) U.S. Cl.
CPC ............ *C01F 11/185* (2013.01); *B28B 1/007* (2013.01); *C01F 11/181* (2013.01); *C04B 28/188* (2013.01); *C04B 40/0236* (2013.01); *C04B 41/0063* (2013.01); *C04B 2111/00612* (2013.01)

(58) Field of Classification Search
CPC ..... C04B 28/02; C04B 28/082; C04B 28/188; C04B 40/0078; C04B 40/0231; C04B 40/0236; C04B 40/024; C04B 41/0063; C04B 2111/00612; C04B 2111/54; C04B 2111/80; C01F 11/181; C01F 11/185; C01P 2002/20; C01P 2004/03; B28B 1/007

See application file for complete search history.

(56) References Cited

FOREIGN PATENT DOCUMENTS

CN   109279835 A   1/2019

OTHER PUBLICATIONS

Liu Songhui et al. "Activation of γ-C2S Mineral by Accelerated Carbonation",, «Journal of the Chinese Ceramic Society» , vol. 44, No. 5, pp. 658-662.

*Primary Examiner* — Anthony J Green
(74) *Attorney, Agent, or Firm* — WPAT, PC

(57) ABSTRACT

The invention discloses an artificial nacre material with layered structure and preparation method thereof. The preparation method includes the following steps: uniformly mixing a carbonated cementitious material and water at a water-solid ratio of 0.3 to 1.2 to obtain a carbonated cementitious material suspension; treating the carbonated cementitious material suspension by a freeze-casting process to obtain a carbonated cementitious material coagulation with layered structure; treating the carbonated cementitious material coagulation with the layered structure by a freeze-drying process to obtain a carbonated cementitious material with layered structure; treating the carbonated cementitious material with layered structure by a carbonization process to obtain an artificial nacre material with layered structure. The obtained artificial nacre material with layered structure has higher fracture toughness and durability, and the preparation method has the advantages of low energy consumption, carbon dioxide fixation and environmental friendliness.

8 Claims, 2 Drawing Sheets

ARTIFICIAL NACRE MATERIAL WITH LAYERED STRUCTURE AND PREPARATION METHOD THEREOF

FIELD OF THE DISCLOSURE

The disclosure relates to an artificial nacre material with layered structure and preparation method thereof, which can be used in the field of bionic technology.

BACKGROUND

At present, ordinary cement-based materials have the problems of low fracture toughness and sensitivity to microcracks and microdefects, which facilitates the ingress of harmful media (such as chloride ions, sulfate ions) and greatly reduce the durability and in-service performance of concrete structures. As infrastructure construction gradually extends to the extreme deep-sea environment, major concrete projects such as cross-sea bridges and South China Sea islands and reefs are facing severe environmental tests such as high salt concentration, strong ultraviolet radiation, and wide temperature and humidity changes. Therefore, more stringent technical requirements are put forward for the durability of concrete materials.

Nacre is a natural composite material, which has a lamellar structure ranging from macroscopic to microscopic. Although most of it is composed of brittle aragonite calcium carbonate, its unique layered structure makes the overall toughness more than 3000 times that of a single aragonite flake. On the microscale, nacre presents a three-dimensional "brick and mortar" structure, in which 95 vol aragonite calcium carbonate flakes are densely stacked as "bricks", and 5 vol biopolymers are used as "mortar" to connect the aragonite pieces. It is composed of a layered hierarchical structure with alternating soft and hard phases, which gives it excellent mechanical properties. It achieves the combination of strength, toughness and hardness, and surpasses synthetic metals, ceramics, plastics and other materials. Through bionic research on the nacre, a series of bionic high-strength and super-tough layered composite materials have been prepared by different techniques. And these materials show broad application prospects in the fields of aerospace, military, civil and mechanical engineering.

Freeze-casting technology is one of the bionic methods, also called directional freeze-thaw technology, which can be used to prepare layered structures and provide technical support for the preparation of layered materials. The principle is based on the kinetic theory of freezing, and the formation and growth of ice crystals are controlled by changing the parameters of the freeze-casting technology to obtain a material with a layered morphology. In recent years, the freeze-casting technology has been widely used, and its advantages are increasingly reflected. Compared with the traditional layered material preparation technology, such as sol-gel method, foaming method, adding hole method, extrusion molding method, the advantages of freeze-casting technology are as follows: 1, the sublimation of the slurry solvent can prevent the green body from cracking due to drying shrinkage and stress during normal drying; 2, it is harmless to the environment and suitable for a wide range of systems; 3, the amount of additives is small; 4, the prepared layered structure morphology doesn't include chemical effects and has better mechanical properties.

At present, freeze-casting technology is mainly used in the field of ceramic preparation. In the process of preparing biomimetic ceramic materials, although the mechanical properties of the materials are improved compared with ordinary ceramics, they consume a lot of energy during the sintering process; at the same time, compared with traditional cement-based materials, the limitations of the manufacturing process make the material less tough and durable, which is not conducive to the long-term use of the material. In addition, with the rapid development of industry today, a large amount of $CO_2$ emissions has gradually increased the global temperature, leading to the greenhouse effect, which is contrary to the sustainable development. Therefore, the use of $CO_2$ has attracted more and more attention from scholars.

Therefore, there is an urgent need to develop new high-performance structural materials to meet the needs of green and sustainable development.

SUMMARY

A technical problem to be solved by the disclosure is that cement-based materials have poor fracture toughness in the prior art.

In the first aspect, the present invention provides a preparation method of an artificial nacre material with layered structure, comprising the following steps:

Uniformly mixing a carbonated cementitious material and water at a water-solid ratio of 0.3 to 1.2 to obtain a carbonated cementitious material suspension.

Treating the carbonated cementitious material suspension by a freeze-casting process to obtain a carbonated cementitious material coagulation with layered structure.

Treating the carbonated cementitious material coagulation with the layered structure by a freeze-drying process to obtain a carbonated cementitious material with layered structure.

Treating the carbonated cementitious material with layered structure by a carbonization process to obtain an artificial nacre material with layered structure.

In second aspect, an artificial nacre material with layered structure, which is prepared by the preparation method of an artificial nacre material with layered structure of the invention above.

The advantages of the technical scheme proposed in the disclosure are:

The technical scheme obtains an artificial nacre material with layered structure by combining the freeze-casting process and the carbonization process. The obtained material has higher fracture toughness and durability. At the same time, the preparation process has low energy consumption and the effect of solidifying carbon dioxide. And it has the advantages of no waste and environmental friendliness.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to make the objectives, technical schemes and advantages of the present invention clearer, the following further describes the present invention in detail with reference to the accompanying drawings and embodiments. It should be understood that the specific embodiments described here are only used to explain the present invention, not to limit the present invention.

Figure 1:
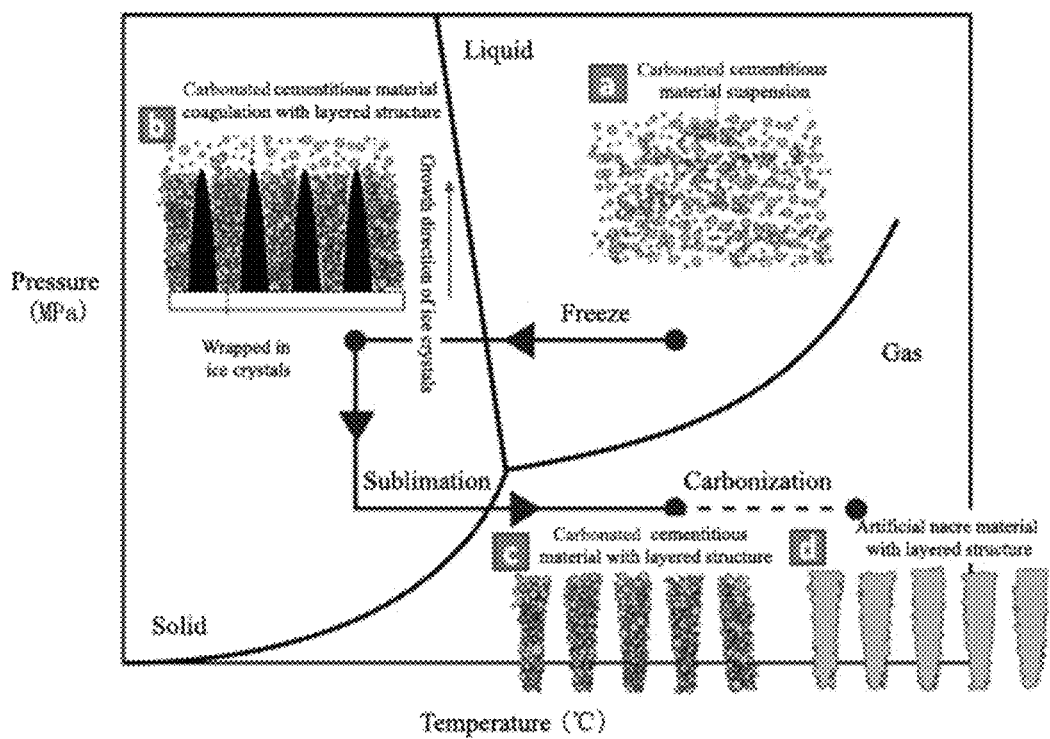
FIG. 1 is a flow chart of the preparation method of an artificial nacre material with layered structure.

As shown in FIG. 1, the first aspect of the present invention provides a method for preparing an artificial nacre material with layered structure, which includes the following steps:

(a) uniformly mixing a carbonated cementitious material and water at a water-solid ratio of 0.3 to 1.2 to obtain a carbonated cementitious material suspension;

(b) treating the carbonated cementitious material suspension by a freeze-casting process to obtain a carbonated cementitious material coagulation with layered structure;

(c) treating the carbonated cementitious material coagulation with the layered structure by a freeze-drying process to obtain a carbonated cementitious material with layered structure;

(d) treating the carbonated cementitious material with layered structure by a carbonization process to obtain an artificial nacre material with layered structure.

In the present invention, the carbonated cementitious material suspension which is mixed with carbonated cementitious material and water is processed by the freeze-casting process, so that the carbonated cementitious material in the system is arranged in a directional arrangement; then removing by freeze-drying, and obtaining a carbonated cementitious material with layered structure; finally, an artificial nacre material with a layered structure is formed by a carbonization process. The preparation process has the effect of solidifying carbon dioxide, and has the advantages of no waste and environmental friendliness.

The carbonization process in the present invention, which is different from the hydration reaction of ordinary hydraulic cementitious materials, and it has outstanding characteristics such as rapid strength development and high mechanical properties. The carbonization process of carbonated cementitious materials with layered structure is a chemical reaction of in-situ growth, which makes the crystalline, crystal morphology and growth rate controllable, and the carbonization process is relatively close to the natural nacre formation process. At the same time, aragonite-type calcium carbonate, which is one of the components of the carbonization product, is similar to its composition. It is more conducive to the improvement of material mechanical properties.

In the present invention, the carbonated cementitious material is selected as the base material, wherein the main composition of the carbonated cementitious material is calcium carbonate, which is similar to the composition of the natural nacre. At the same time, the carbonization of calcium silicate minerals is a chemical reaction of in-situ growth. The crystalline, crystal morphology and growth rate are controllable, which is relatively close to the natural nacre formation process.

In the present invention, the water-solid ratio range of 0.3 to 1.2 is more conducive to the formation of layered structure. If the water-solid ratio is too high, the concentration of the carbonated cementitious material suspension will be too low, and it will not be conducive to the uniform distribution of solid particles after freezing, resulting in failure to form a layered structure. If the water-solid ratio is too low, the concentration of the suspension of the carbonated cementitious material is too high and the freezing is less, the carbonated cementitious material cannot be aggregated, resulting in failure to form a layered structure.

Preferably, the carbonated cementitious material is one or more of gamma dicalcium silicate ($\gamma$-$C_2S$), monocalcium silicate, steel slag, and tricalcium disilicate. The above-mentioned carbonated binding materials all have lower hydration activity and higher carbonization activity, which are convenient for the subsequent carbonization process. It can make the artificial nacre material with layered structure have excellent mechanical properties.

Furthermore, the carbonated cementitious material is one or more of gamma dicalcium silicate ($\gamma$-$C_2S$), monocalcium silicate, and tricalcium disilicate. Using the above-mentioned materials as raw materials, aragonite-type calcium carbonate with the same composition as the nacre material can be generated after carbonization, which can further improve the mechanical properties of the material.

Furthermore, the water-solid ratio in the above carbonated cementitious material suspension is 1. Under the condition of this water-solid ratio, the obtained artificial nacre material with layered structure has the best mechanical properties.

Preferably, the specific freeze-casting process is as follows: placing the prepared carbonated cementitious material suspension in a freeze-casting machine for unidirectional freezing; specifically, cooling down from 20~35° C. to −90~−30° C. at a freezing rate of 1 to 10° C./min and an entire freezing time is 0.5~5 h.

It should be noted here that the entire freezing time of the above-mentioned whole process refers to the total time of the unidirectional freezing of the carbonated cementitious material suspension in a freeze-casting machine, which includes the cooling time and the constant temperature time.

Furthermore, in the freeze-casting process, cooling down from 20~35° C. to −90~−60° C. at a freezing rate of 1 to 3° C./min an d an entire freezing time is 1~3 h.

Preferably, the specific freeze-drying process is as follows: placing the carbonated cementitious material coagulation with layered structure in a freeze-casting machine for freezing; specifically, a freeze-drying temperature is −20~−5° C., a freeze-drying time is 6~12 h, and a vacuum degree is −0.1~−0.05 MPa.

Preferably, the specific carbonization process is as follows: placing the carbonated cementitious material with layered structure in an environment with both water vapor and carbon dioxide gas for carbonization.

Furthermore, in the carbonization process, a mass concentration of carbon dioxide is 40~99.9%, a volume ratio of carbon dioxide to water vapor is (10~20):1, a relative humidity is 5~20%, an air pressure is 0.1~0.5 MPa, an initial carbonization temperature is 5~30° C. and a carbonization time is 2~8 h.

In second aspect, the invention provides an artificial nacre material with layered structure, which is prepared by the preparation method of an artificial nacre material with layered structure in the first aspect above.

The following specific examples illustrate the performance and effect of the above-mentioned artificial nacre material with layered structure.

Example 1

(1) Uniformly mixing 20 g $\gamma$-$C_2S$ and 6 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −60° C. at a freezing rate of 1° C./min and an entire freezing time is 1.5 h.

(3) Placing the carbonated cementitious material coagulation with layered structure in a freeze-casting machine for freezing, and obtaining a carbonated cementitious material with layered structure; specifically, a freeze-drying temperature is −5° C., a freeze-drying time is 6 h, and a vacuum degree is −0.1 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Example 2

(1) Uniformly mixing 20 g γ-$C_2$S and 10 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −60° C. at a freezing rate of 1° C./min and an entire freezing time is 1.5 h.

(3) Placing the carbonated cementitious material coagulation with layered structure in a freeze-casting machine for freezing, and obtaining a carbonated cementitious material with layered structure; specifically, a freeze-drying temperature is −5° C., a freeze-drying time is 6 h, and a vacuum degree is −0.08 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Example 3

(1) Uniformly mixing 20 g γ-$C_2$S and 10 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −60° C. at a freezing rate of 1.5° C./min and an entire freezing time is 1 h.

(3) Placing the carbonated cementitious material coagulation with layered structure in a freeze-casting machine for freezing, and obtaining a carbonated cementitious material with layered structure; specifically, a freeze-drying temperature is −5° C., a freeze-drying time is 6 h, and a vacuum degree is −0.08 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Example 4

(1) Uniformly mixing 20 g γ-$C_2$S and 12 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −60° C. at a freezing rate of 1.5° C./min and an entire freezing time is 1 h.

(3) Placing the carbonated cementitious material coagulation with layered structure in a freeze-casting machine for freezing, and obtaining a carbonated cementitious material with layered structure; specifically, a freeze-drying temperature is −10° C., a freeze-drying time is 6 h, and a vacuum degree is −0.1 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Example 5

(1) Uniformly mixing 20 g γ-$C_2$S and 20 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −90° C. at a freezing rate of 1.5° C./min and an entire freezing time is 2 h.

(3) Placing the carbonated cementitious material coagulation with layered structure in a freeze-casting machine for freezing, and obtaining a carbonated cementitious material with layered structure; specifically, a freeze-drying temperature is −10° C., a freeze-drying time is 6 h, and a vacuum degree is −0.1 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Example 6

(1) Uniformly mixing 20 g γ-$C_2$S and 20 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −90° C. at a freezing rate of 1.5° C./min and an entire freezing time is 2 h.

(3) Placing the carbonated cementitious material coagulation with layered structure in a freeze-casting machine for freezing, and obtaining a carbonated cementitious material with layered structure; specifically, a freeze-drying temperature is −20° C., a freeze-drying time is 6 h, and a vacuum degree is −0.1 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Example 7

(1) Uniformly mixing 20 g γ-$C_2S$ and 20 g water and obtaining a carbonated cementitious material suspension.

(2) Placing the prepared carbonated cementitious material suspension in a freeze-casting machine for unidirectional freezing, and obtaining a carbonated cementitious material coagulation with layered structure; specifically, cooling down from room temperature to −90° C. at a freezing rate of 1.5° C./min and an entire freezing time is 2 h.

(3) Placing the carbonated cementitious material coagulation with layered structure in a freeze-casting machine for freezing, and obtaining a carbonated cementitious material with layered structure; specifically, a freeze-drying temperature is −20° C., a freeze-drying time is 6 h, and a vacuum degree is −0.1 MPa.

(4) Placing the carbonated cementitious material with layered structure in an environment with both water vapor and carbon dioxide gas for carbonization, and obtaining an artificial nacre material with layered structure; specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Comparative Example 1

Uniformly mixing 20 g γ-$C_2S$ and 3 g water, placing in a mold for compression molding to obtain a green body; placing the green body in an environment with both water vapor and carbon dioxide gas for carbonization, and obtaining a sample. Specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Comparative Example 2

Uniformly mixing 20 g steel slag and 3 g water, placing in a mold for compression molding to obtain a green body; placing the green body in an environment with both water vapor and carbon dioxide gas for carbonization, and obtaining a sample. Specifically, a mass concentration of carbon dioxide is 99.9%, a volume ratio of carbon dioxide to water vapor is 19:1, a relative humidity is 5%, an air pressure is 0.3 MPa, an initial carbonization temperature is 25° C. and a carbonization time is 2 h.

Test 1

Figure 2:
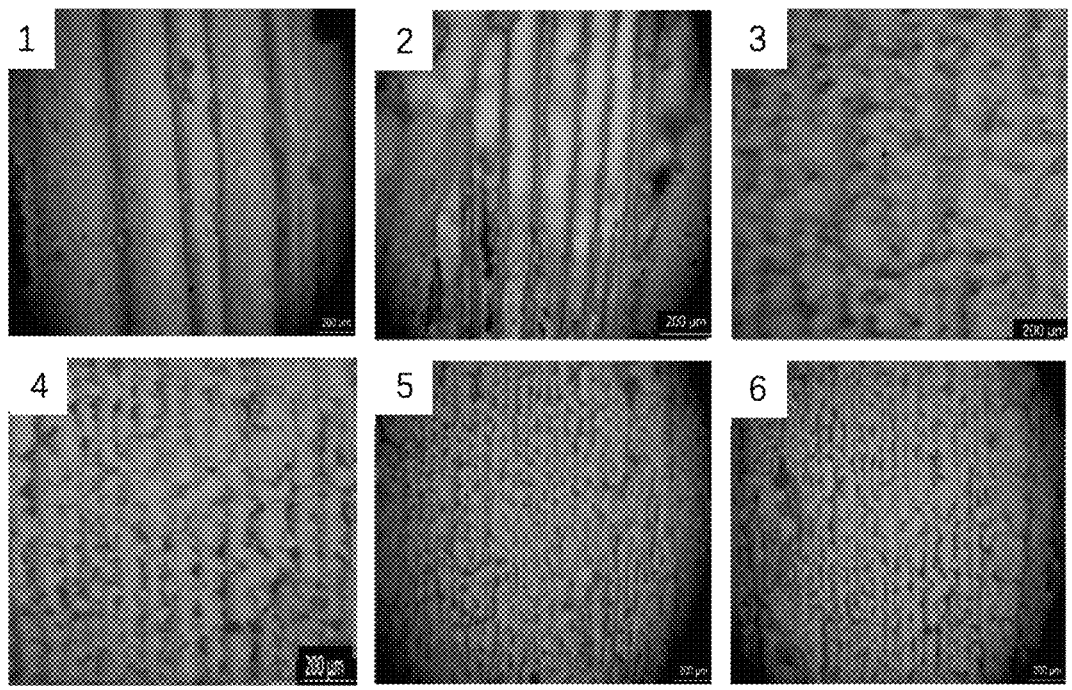
FIG. 2 is a scanning electron microscope (SEM) image of the artificial nacre material with layered structure in Examples 1 to 6.
Figure 3:
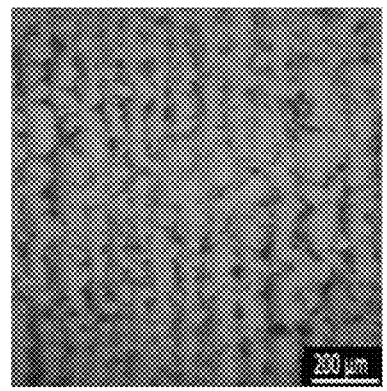
FIG. 3 is a scanning electron microscope (SEM) image of the artificial nacre material with layered structure in Example 7.

The morphological characterization of the artificial nacre material with layered structure obtained in the Examples 1 to 7 was performed, and the results are shown in Table 1, FIG. 2 and FIG. 3.

TABLE 1

|  | Layer spacing (μm) | Single layer thickness (μm) |
| --- | --- | --- |
| Example 1 | 46 | 43 |
| Example 2 | 41 | 39 |
| Example 3 | 33 | 34 |
| Example 4 | 24 | 22 |
| Example 5 | 18 | 17 |
| Example 6 | 14 | 13 |
| Example 7 | 16 | 14 |

It can be seen from the above Table 1, FIG. 2 and FIG. 3 that the artificial nacre material with layered structure prepared in Examples 1 to 7 of the present invention all have a layered structure; due to differences in water-solid ratio and freeze-casting conditions, the final layered structure of the samples is also different. Specifically, as the water-solid ratio increases, the layer spacing and single layer thickness gradually decrease; as the freezing temperature decreases, the layer spacing and single layer thickness also slightly decrease.

Test 2

The mechanical properties of the samples obtained in the foregoing Examples 1 to 7 and Comparative Examples 1 to 2 are tested, and the results are shown in Table 2. Specifically, a universal testing machine (Instron 5689, Instron Corp., USA) is used to measure the compressive strength and tensile strength of the sample, and the fracture toughness of the material was calculated by the formula $K_{JC}=0.0725 \cdot (P/a^{2/3})$; wherein P is the load capacity and a is the average crack length.

TABLE 2

|  | Compressive strength (MPa) | Tensile strength (MPa) | Fracture toughness (MPa · $m^{1/2}$) |
| --- | --- | --- | --- |
| Example 1 | 98 | 42 | 2.5 |
| Example 2 | 115 | 43 | 2.5 |
| Example 3 | 120 | 48 | 2.8 |
| Example 4 | 134 | 55 | 3.2 |
| Example 5 | 157 | 58 | 3.6 |
| Example 6 | 159 | 60 | 3.8 |
| Example 7 | 142 | 52 | 3.2 |
| Comparative Example 1 | 42 | 12 | 0.4 |
| Comparative Example 2 | 36 | 9 | 0.3 |

It can be seen from Table 2 that the samples obtained in Examples 1 to 7 of the present invention all have good compressive strength, tensile strength and fracture toughness, and the tendency of the sample properties is consistent with the tendency of the layered structure; among them, the sample in Example 6 has the best mechanical properties. The reason is that Example 6 has a higher water-solid ratio and a lower freezing temperature, and the obtained sample of the artificial nacre material with layered structure has the lowest layer spacing and single layer thickness, which ultimately leads to the best mechanical properties. Compared with the sample in Example 6, the sample in Example 7 has poor mechanical properties. The reason is that in Example 7, there is more free calcium oxide in the steel slag. Compared with γ-C$_2$S under the same conditions, the free calcium oxide in the steel slag slightly reduces the strength and toughness of the obtained material. Compared with Examples 1 to 7, the samples in Comparative Examples 1 to 2 don't form a layered structure because they were prepared only by the carbonization process, which ultimately resulted in poor mechanical properties.

In summary, the preparation method of an artificial nacre material with layered structure provided by the present invention combines the freeze-casting process and the carbonization process, and has the advantages of low energy consumption, carbon dioxide fixation and environmental friendliness; the obtained artificial nacre material with layered structure has higher fracture toughness and durability.

The above descriptions are only preferred embodiments of the present invention and are not intended to limit the present invention. Any modification, equivalent replacement, improvement, etc. made within the spirit and principle of the present invention shall be included in the protection of the present invention.

What is claimed is:

1. A preparation method of an artificial nacre material with layered structure, comprising the following steps:
   uniformly mixing a carbonated cementitious material and water at a water-solid ratio of 0.3 to 1.2 to obtain a carbonated cementitious material suspension, wherein the carbonated cementitious material is one or more of gamma dicalcium silicate, monocalcium silicate, steel slag, and tricalcium disilicate;
   treating the carbonated cementitious material suspension by a freeze-casting process to obtain a carbonated cementitious material coagulation with layered structure;
   treating the carbonated cementitious material coagulation with the layered structure by a freeze-drying process to obtain a carbonated cementitious material with layered structure;
   treating the carbonated cementitious material with layered structure by a carbonization process to obtain an artificial nacre material with layered structure.

2. The preparation method of an artificial nacre material with layered structure according to claim 1, wherein a water-solid ratio of the carbonated cementitious material suspension is 1.

3. The preparation method of an artificial nacre material with layered structure according to claim 1, wherein the specific freeze-casting process is as follows: placing the prepared carbonated cementitious material suspension in a freeze-casting machine for unidirectional freezing; specifically, cooling down from 20~35° C. to −90~−30° C. at a freezing rate of 1 to 10° C./min and an entire freezing time is 0.5~5 h.

4. The preparation method of an artificial nacre material with layered structure according to claim 1, wherein the specific freeze-drying process is as follows: placing the carbonated cementitious material coagulation with layered structure in a freeze-casting machine for freezing; specifically, a freeze-drying temperature is −20~−5° C., a freeze-drying time is 6~12 h, and a vacuum degree is −0.1~−0.05 MPa.

5. The preparation method of an artificial nacre material with layered structure according to claim 1, wherein the specific carbonization process is as follows: placing the carbonated cementitious material with layered structure in an environment with both water vapor and carbon dioxide gas for carbonization.

6. The preparation method of an artificial nacre material with layered structure according to claim 5, in the carbonization process, a mass concentration of carbon dioxide is 40~99.9%, a volume ratio of carbon dioxide to water vapor is (10~20):1, a relative humidity is 5~20%, an air pressure is 0.1~0.5 MPa, an initial carbonization temperature is 5~30° C. and a carbonization time is 2~8 h.

7. The preparation method of an artificial nacre material with layered structure according to claim 1, wherein the carbonated cementitious material is one or more of gamma dicalcium silicate, monocalcium silicate, and tricalcium disilicate.

8. An artificial nacre material with layered structure, wherein the artificial nacre material with layered structure is prepared by the preparation method of an artificial nacre material with layered structure according to claim 1.

* * * * *